A. O. HAGSTEDT.
FLYING MACHINE, &c.
APPLICATION FILED FEB. 18, 1909.
954,733.
Patented Apr. 12, 1910.
3 SHEETS—SHEET 1.
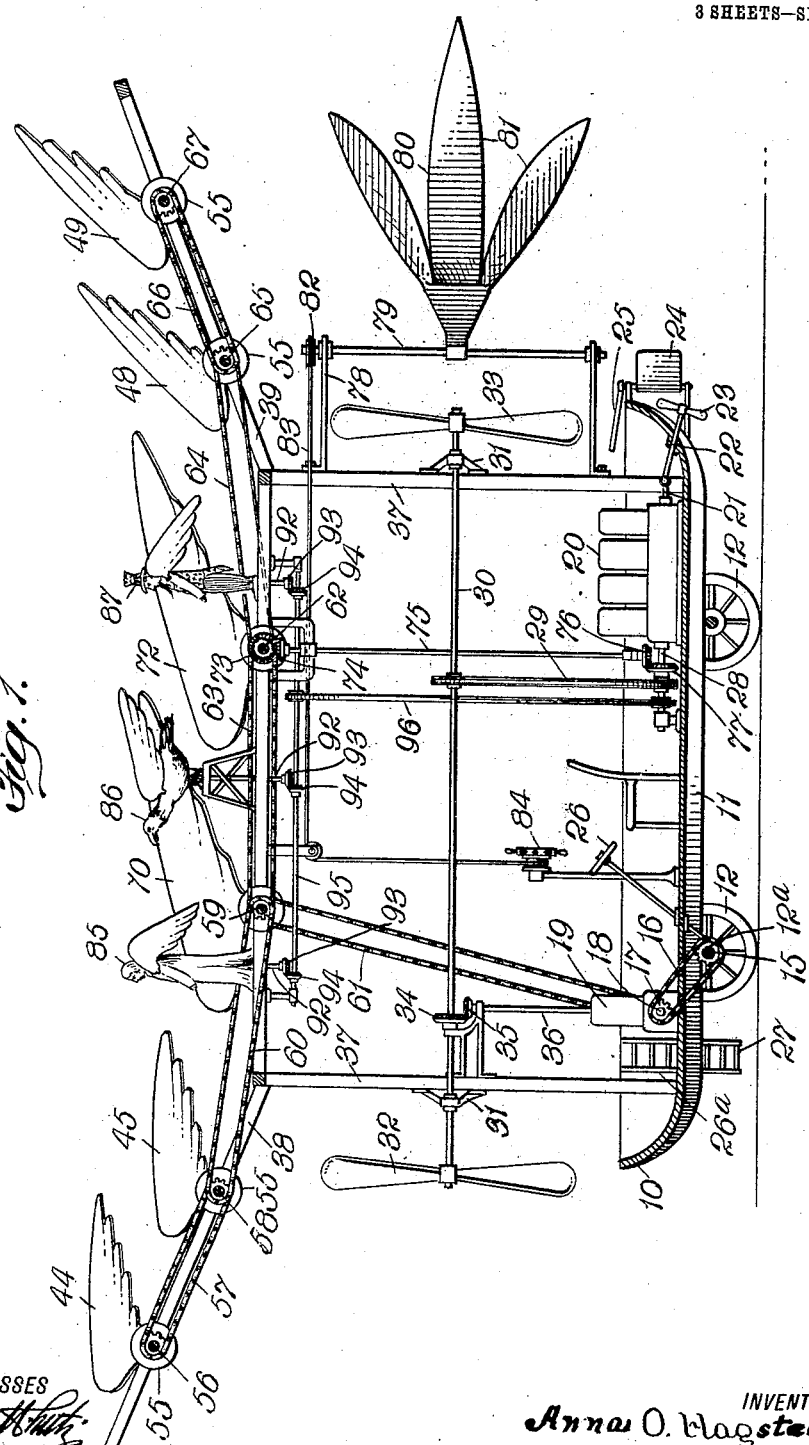
WITNESSES
INVENTOR
Annas O. Hagstedt.
BY
Criswell & Criswell
ATTORNEYS

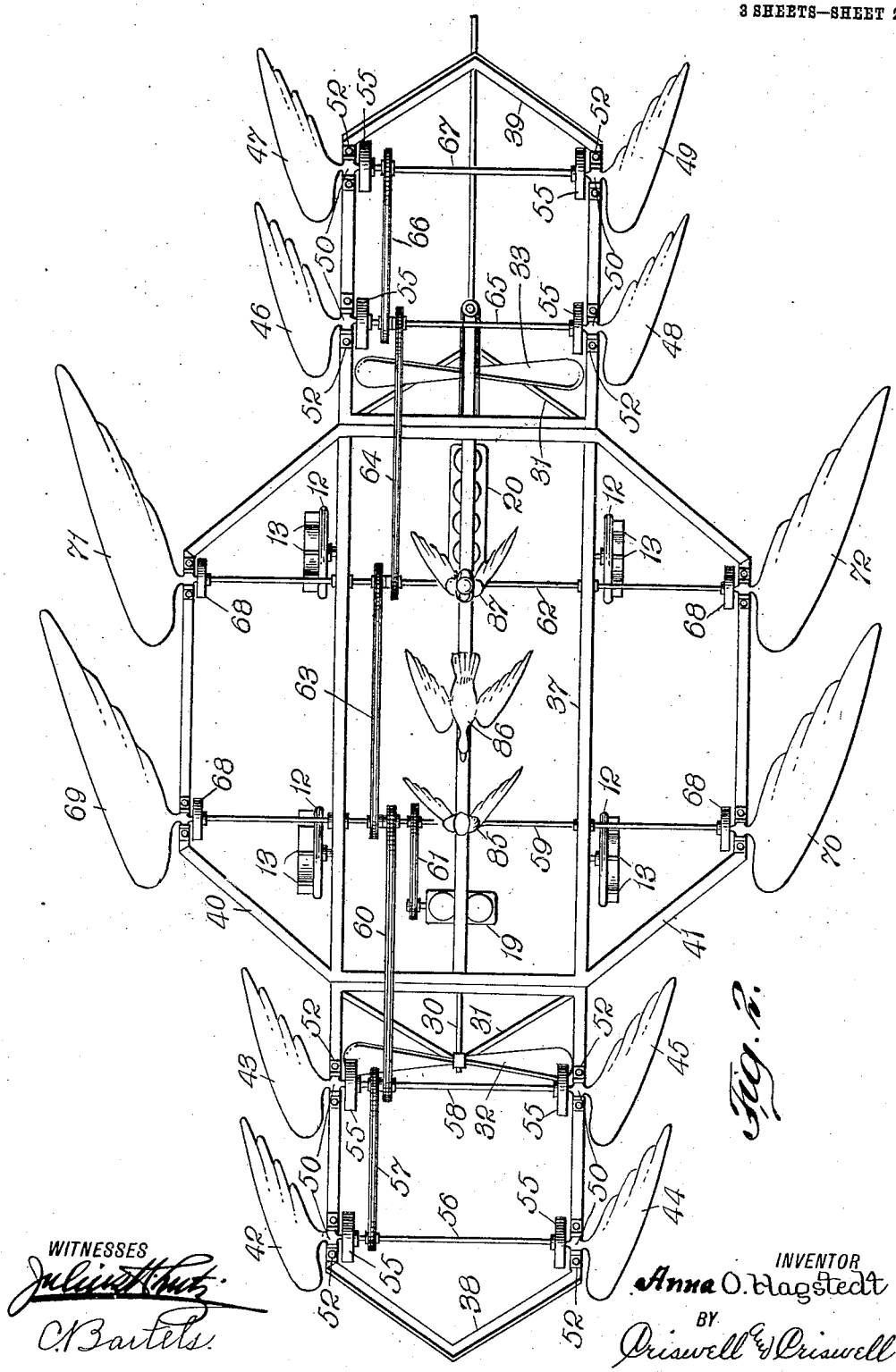

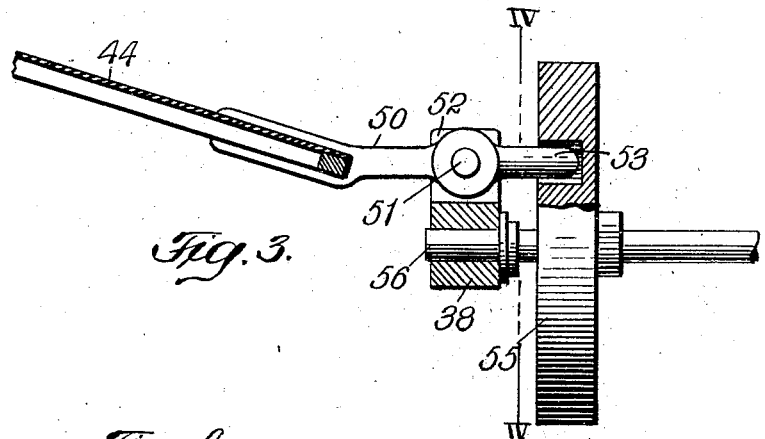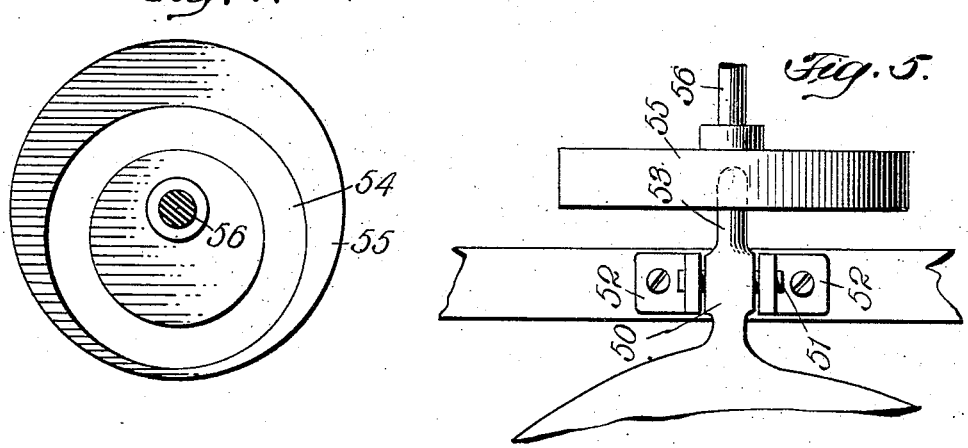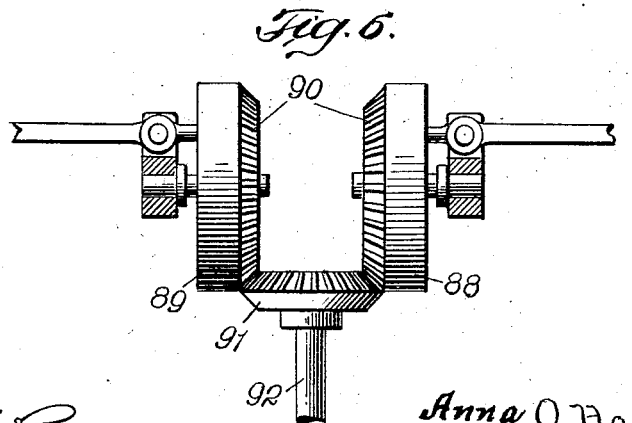

UNITED STATES PATENT OFFICE.

ANNA O. HAGSTEDT, OF NEW YORK, N. Y.

FLYING-MACHINE, &c.

954,733.  Specification of Letters Patent.  Patented Apr. 12, 1910.

Application filed February 18, 1909. Serial No. 478,748.

*To all whom it may concern:*

Be it known that I, ANNA O. HAGSTEDT, a subject of the King of Sweden, and a resident of New York, county and State of New York, have invented certain new and useful Improvements in Flying-Machines, &c., of which the following is a full, clear, and exact description.

This invention relates more particularly to a combined flying machine, boat and motor vehicle.

The primary object of the invention is to provide a strong, light and effective device or apparatus which may be used as a flying machine, and which is so constructed that the said machine may utilize the same power that drives the means for propelling the machine through the air to force the same along the ground, or in case of accidents or for other reasons, to propel the same on the water, thus adapting the machine for the different purposes mentioned, and overcoming many of the objections incident to machines of this character as ordinarily constructed.

Another object of the invention is to provide auxiliary power means to assist the machine in its flight, or to be used in case of accidents or for other purposes, and particularly when the machine is being lowered to the ground.

Other objects are to provide wings or devices which are so held to the machine that the same may have the action corresponding to that of large birds to assist in propelling and controlling the machine; to provide a machine which is so made that various features of the usual form of aeroplane may be incorporated therewith, and to provide main and auxiliary power means which may be simultaneously or independently operated as occasion may require.

A further object of the invention is to provide a body which is light and strong, and which is adapted to be supported upon wheels so arranged that they may be positively driven by the propelling mechanism and which body may be boat-like in form, and may be propelled as well as steered while using the same as a boat or hydroplane.

With these and other objects in view, the invention will be hereinafter more particularly described with reference to the accompanying drawings which form a part of this specification, and will then be pointed out in the claims at the end of the description.

In the drawings, Figure 1 is a vertical section through the body or boat portion showing the main operating parts in elevation of one form of machine embodying my invention. Fig. 2 is a plan view. Fig. 3 is a transverse section, partly in elevation, of one form of means for operating the wings. Fig. 4 is a transverse section taken on a line IV—IV of Fig. 3, showing the cam for moving the wings. Fig. 5 is a fragmentary plan view; and Fig. 6 shows how certain of the wings may be simultaneously operated.

While I shall show the invention as constructed to perform several functions, that is a flying machine, a boat or a motor vehicle, it will be understood that either of these features may be dispensed with, and that various parts of the machine may be differently constructed to adapt it as a flying machine alone or in connection with either of the features referred to, and that the general character of the frame and propelling mechanism may be changed without departing from the invention.

The body 10 of the machine is substantially in the form of the body of a boat, and may be made of any suitable material, whether cork, wood, aluminum or other metal, and under the body may be arranged one or more keels 11 of cork or other material, and supporting the body 10 are the wheels 12. These wheels may correspond with the ordinary form of automobile wheels and may have wings or blades, as 13, extending from the side thereof as shown in Fig. 2, to assist in propelling the machine whether through the air or through the water, and on the axle of the forward wheels is a sprocket wheel 15 which may be rotated by a chain 16 which passes around the sprocket wheel 17 of the motor shaft 18 of an auxiliary gasolene or other motor 19 arranged in the forward part of the body 10, the said sprocket chain being connected from within the body and so arranged that the body will not leak, or the shaft 17 may be extended through the side of the body and the chain or other connection arranged to operate the forward axle 12$^a$ from the outside of the body 10.

The main motor 20, which may be gasolene or of any suitable kind, may be arranged in the rear part of the body 10, and this motor may have its shaft at one end, as at 21, connected to a propeller shaft 22 on the end of which is a propeller 23 when the machine is to be used as a boat to be propelled through the water. At the rear of the body portion is a rudder 24 which may be operated by a tiller 25 or in any other desired way for steering the machine when used as a boat, and when the machine is employed as a motor vehicle, the forward axle 12ª or the wheels 12 may be manipulated through a steering wheel 26 in the usual or in any preferred way to adapt the vehicle to be properly steered along the ground. The forward portion of the body 10 may have a stairway 26ª for the passengers to enter or leave the body or car 10, and on the outside of said body may be arranged a ladder or stairway 27 connecting with the stairway 26ª.

To propel the machine in its flight through the air various means may be employed. As shown the forward end 28 of the shaft of the motor 20 is provided with a sprocket wheel around which passes a chain 23, and this chain passes around a sprocket wheel on the longitudinally-extending shaft 30. The shaft 30 may be suitably journaled in brackets 31 located at the front and at the rear of the machine, and at the forward end of said shaft may be arranged a propeller 32, and at the rear end a propeller 33 whereby when the shaft 30 is rotated, the machine may be propelled forward, and in case of necessity backward as either or both motors may be operated in either direction. The shaft 30 may be provided with a bevel gear 34, and this gear is in mesh with the gear 35 arranged on the vertical shaft 36 which may be operatively connected to the auxiliary motor 19, and said connection may be provided with a clutch whereby the shaft 36 may be disconnected to adapt the motors 20 and 19 to operate the shaft 30 independently of each other or together as desired.

The machine may be assisted in its flight by devices in addition to the propellers 32 and 33. As shown the frame 37 of the machine which may be of aluminum or other material is provided with forwardly and rearwardly extending brackets or extensions 38 and 39 which incline upwardly, and at the upper portion of the frame are lateral extensions or brackets 40 and 41 extending on opposite sides of said frame. On the brackets or extensions 38 and 39 and parts 40 and 41 are arranged a plurality of wings or devices which are adapted to be moved in a manner substantially similar to the movement of the wings of birds and which are adapted to assist in the flight of the machine and also when the machine is to be lowered to the ground. On the extension 38 are wings or devices 42, 43, 44 and 45 and movably held on the rear extension or bracket 39 are the wings 46, 47, 48 and 49.

Each of the wings or devices is provided with a bracket 50, and this bracket is provided with pintles 51 which are held in brackets 52 mounted on the top of the machine frame so that the wings may be moved up and down, and one end of said bracket, as 53, enters a cam groove 54 to a cam 55 so that when said cam is rotated, as will be presently described, the wing connected thereto will be given an up-and-down movement so as to assist in raising and manipulating the machine during the flight thereof. The cams 55 of the wings 42 and 44 may be connected together by means of a shaft 56, and this shaft 56 is operatively connected by a sprocket chain 57 to a transversely-extending shaft 58 to which the cams 55 of the devices 43 and 45 are connected. The shaft 58 is operatively connected to the transversely-extending shaft 59 by the sprocket chain 60 which passes around sprocket wheels located on said shaft, and said shaft 59 is operatively connected by the sprocket chain 61 to the shaft of the auxiliary motor 19, though the latter connection may be such that the motor 19 may be operated without operating the shafts of the wing devices. A second transversely-extending shaft 62 is connected to the shaft 59 by a sprocket chain 63, and said shaft 62 is operatively connected by a sprocket chain 64 with a shorter transverse shaft 65, and this shaft is connected by a chain 66 to the shaft 67 whereby all of the shafts for operating the wings or devices may be moved in unison. The longer transverse shafts 59 and 62 may be each provided with cams 68 which are adapted to operate the wings 69, 70, 71 and 72 in substantially the same manner as the wings or devices 42 to 49. The wings 69 to 72 may be somewhat larger than the wings on the extensions 38 and 39 and may be of any suitable number and constructed in any desired manner, and instead of the wings or devices being operated by the auxiliary motor 19, they may be operated in conjunction with said motor or independently operated through the motor 20. To effect this the transverse shaft 62 may be provided with a bevel gear 73 and meshing with this gear is a bevel gear 74 secured to a vertically extending shaft 75, which latter shaft may be provided with a bevel gear 76 that meshes with a similar gear 77 on the motor shaft. By this means the wings or devices may be operated by either or both motors, though if the motor 19 is to move said devices independently of the motor 20, a suitable clutch should be provided to permit the motor 20 to operate independently of the vertically extending shaft 75.

As one means for steering the machine, I may secure brackets 78 to the rear uprights of the machine frame, and movable in said brackets is a shaft or upright 79 to which is held a rudder 80. This rudder 80 may comprise a plurality of members 81 and may be made to correspond substantially with the tail of a bird or otherwise made to permit the machine to be properly steered during its flight, and at the upper end of the shaft 79 is a pulley 82 around which may pass a rope or flexible connection 83 which is connected to a steering drum 84 located within convenient reach of the pilot or other person from within the body 10 of the machine.

The machine may be made attractive and in addition to the wings or devices by figures or representations of objects being arranged upon the top of the machine frame 37. As shown three objects are represented. A figure, as 85, represents an angel, a figure 86 represents an eagle, and at 87 is a representation of "Uncle Sam". Each of these figures may have movable wings which are operated in substantially the same manner as the wings 42 to 49. Within each object or figure are the cams 88 and 89, Fig. 6, and these cams are provided with teeth, as 90, on one face thereof, and are operatively connected by a cam groove as already described to the wings of the object. A bevel gear 91 meshes with the teeth 90, and this gear is held to a shaft 92 which extends within the object, and on the lower end of each of said shafts is a bevel gear 93 which is in mesh with the bevel gear 94 held to a longitudinally-extending shaft 95. This shaft 95 is journaled in suitable brackets supported by the machine frame, and said shaft is connected by a sprocket chain 96 to the shaft of the motor 20, so that when the said motor is operated, the shaft 95 will be rotated and through it operate the wings or devices of the objects 85, 86 and 87.

The auxiliary motor 19 may be used independently of the larger and more powerful motor 20 in case of accident, and said motor may be used with or independent of the motor 20 to drive the wings or devices located at the upper part of the machine during the manipulation thereof, and more particularly when the machine is being lowered to the ground should an accident occur, and said auxiliary motor may be used when the machine is employed as a motor vehicle. The form of the machine may be varied to adapt the same to be used as a hydroplane in addition to the aeroplane or air-ship features.

It will be understood that either or both of the extensions 38 and 39 may be movable, and so constructed as to offer resistance to the air so that the machine may be manipulated in substantially the same manner as is shown in the ordinary aeroplane, and that any of the features employed in the usual form of aeroplane may be applied in addition to the features already shown or independent thereof if desired. It will be further understood that the wings or devices may be given any desired movement instead of simply an up-and-down movement, as for example a forward and backward movement either with or without an upward and downward movement; and the wings or devices may be of any desired shape and may be constructed to collapse at one movement or so operated as to offer as little resistance as possible to the air when moved in one direction and to offer as much resistance as possible when moved in the opposite direction.

From the foregoing it will be seen that a machine is provided which is constructed for flight through the air and which may also be used either as a motor vehicle or as a boat; that said machine is so constructed that in case of accident auxiliary means may be used to permit the machine to lower gradually to the ground; that simple and effective means are provided for propelling the machine along the ground or through the air or when the same is used as a boat; and that in addition to the features shown certain parts or additional parts may be added to the machine to adapt the same to operate as in the usual form of aeroplane or hydroplane.

Having thus described my invention, I claim as new and desire to secure by Letters Patent:—

1. The combination with a body, of a main and an auxiliary motor supported within the body, propelling means operatively connected to both motors, and movable wings supported above the body and operatively connected to the motors.

2. In a machine of the character described, the combination with a body, of a frame extending above the body, extensions projecting laterally from the frame, extensions arranged at an angle and projecting from the front and rear of the frame, wing-shaped devices supported by said extensions, and mechanism for operating said wing-shaped devices.

3. In a machine of the character described, the combination with a body, of a frame extending above the body, extensions arranged at an angle and projecting from the front and rear of the frame, wing-shaped devices supported by said extensions, and mechanism for operating said devices.

4. In a machine of the character described, the combination with a body, of a frame extending above the body, extensions arranged at an angle, and projecting from the front and rear of the frame, and extensions projecting laterally from the frame, wing-shaped devices supported by said extensions, and means including a motor for operating said devices.

5. In a machine of the character described, the combination with a body, of a frame extending above the body and provided with front and rear extensions angularly arranged with respect to the frame, wing-shaped devices extending outward from the extensions, each provided with a pivotally held bracket, a cam having a groove engaging a part of each bracket and for moving the same on its pivot to impart movement to each of said devices and mechanism for operating the cams.

6. In a machine of the character described, the combination with a body, of a frame extending above the body and provided with extensions, wing-shaped devices extending outward from the frame extensions, each provided with a pivotally held bracket, a cam engaging a part of each bracket and for imparting movement to said devices and means for operating the cams.

7. In a machine of the character described, the combination with a body, of a frame extending above the body and provided with extensions, pivotally held wing-shaped devices extending outward from the extensions, and cams for moving said devices on their pivots.

8. The combination with a body, of a frame extending above the body, angularly arranged extensions at the rear and front of the frame, lateral extensions at the side of the frame, wing-shaped devices pivotally held upon said extensions and arranged in pairs, transversely-extending shafts connecting said wing-shaped devices in pairs, cams carried by said shafts for moving said wing shaped devices, a motor, and connections between the motor and shafts whereby the wing-shaped devices may be operated in unison.

9. In a machine of the character described, the combination with a boat-like body, of a frame extending above said body, a main and an auxiliary motor supported within the body, a longitudinally extending shaft, propellers arranged on said shaft and operatively connected with the motors, wing-shaped devices, means for vibrating said wing-shaped devices, steering mechanism, and means whereby the machine may serve as a motor vehicle.

10. In a machine of the character described, the combination with a boat-like body, of a frame extending above said body, a longitudinally extending shaft, propellers arranged on said shaft, pivotally supported wing-shaped devices, cams for operating the same, steering mechanism, and means whereby the machine may serve as a motor vehicle.

11. In a machine of the character described, the combination with a body, a frame extending above said body, main and auxiliary motors supported within the body, propelling mechanism operatively connected to the motors, wing-shaped devices, means connecting the auxiliary motor and said wing-shaped devices for operating the same and steering mechanism for the machine.

12. The combination with a boat-like body, wheels for supporting the body, an auxiliary and a main motor supported within the body, means for positively driving the wheels by one of the motors, means for propelling the body when in the water, and independent means for propelling the body through the air.

This specification signed and witnessed this 17" day of February A. D. 1909.

ANNA O. HAGSTEDT.

Witnesses:
M. F. KEATING,
C. BARTELS.